US010496368B1

(12) United States Patent
Skreen (10) Patent No.: US 10,496,368 B1
(45) Date of Patent: Dec. 3, 2019

(54) SYSTEMS AND METHODS FOR MEMORY FIFO CONTROL

(71) Applicant: Micron Technology, Inc., Boise, ID (US)

(72) Inventor: Andrew W. Skreen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/055,968

(22) Filed: Aug. 6, 2018

(51) Int. Cl.
*G06F 12/02* (2006.01)
*G06F 5/12* (2006.01)
*G06F 13/42* (2006.01)
*G06F 12/00* (2006.01)

(52) U.S. Cl.
CPC .............. *G06F 5/12* (2013.01); *G06F 12/023* (2013.01); *G06F 13/4234* (2013.01); *G06F 12/00* (2013.01); *G06F 12/02* (2013.01)

(58) Field of Classification Search
CPC ........ G06F 12/023; G06F 12/00; G06F 12/02; G06F 5/12
See application file for complete search history.

(56) References Cited

U.S. PATENT DOCUMENTS

2010/0177106 A1* 7/2010 Kim ................... G09G 5/001
345/531

* cited by examiner

*Primary Examiner* — Ernest Unelus
(74) *Attorney, Agent, or Firm* — Fletcher Yoder, P.C.

(57) ABSTRACT

The present disclosure relates generally to improved systems and methods for control of a first-in, first-out (FIFO memory). More specifically, the present disclosure relates to improved timing and/or control signals used to control operation of the FIFO memory. For example, access circuitry of the memory device may pulse a control signal used to control latching of data at the FIFO memory. Further, the access circuitry may pulse one or more bits of a column address bus to generate a column address corresponding to data to be latched at the FIFO memory. Accordingly, the current, power, and/or area consumed by the memory device may be reduced.

18 Claims, 3 Drawing Sheets

SYSTEMS AND METHODS FOR MEMORY
FIFO CONTROL

BACKGROUND

Field of the Present Disclosure

Embodiments of the present disclosure relate generally to the field of semiconductor memory devices. More specifically, embodiments of the present disclosure relate to control of a first-in, first-out (FIFO) memory used to transfer data in and/or out of the memory devices.

Description of Related Art

To control operation of circuitry included in a memory device, the memory device may use one or more timing and/or control signals. For example, the memory device may route one or more timing and/or control signals to a FIFO memory of the memory device, among other circuitry, to satisfy a read command and/or a write command received from a host device communicatively coupled to the memory device. More specifically, the memory device may control latching of data into the FIFO memory and/or the order of the data bits latched at the FIFO memory, among other things, using the one or more timing and/or control signals. In some embodiments, however, the circuitry used by the memory device to generate the one or more timing and/or control signals may be cumbersome to implement in terms of current, power, and/or area consumption.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described in further detail below, embodiments of the present disclosure relate generally to reducing the area, current, and/or power used by one or more portions of a memory device. More specifically, the present disclosure relates to reducing the area, current, and/or power used by access (e.g., control) circuitry of the memory device to generate control signals and/or timing signals. In some embodiments, a FIFO memory of the memory device may use the generated control and/or timing signals to suitably latch and/or arrange data bits received at the FIFO memory. For example, to maintain open access to a FIFO memory of the memory device (e.g., to receive data at the FIFO memory), the access circuitry may maintain a control signal (e.g., Qin) in a first state. The access circuitry may then transition the control signal to the second state to latch data into a FIFO memory location, such as a particular FIFO memory 14 of the FIFO bank 16 and/or a particular address (e.g., queue position) of the FIFO memory 14. However, in some embodiments, the FIFO memory location may receive data corresponding to a first burst of data bits prior to latching a second burst of data bits. Accordingly, the memory device may include a number of inverters to clear the first burst of data bits from the FIFO memory location prior to latching the second burst of data bits. Further, in some embodiments, the memory device may include an additional number of inverters and/or other delays to delay a control signal (e.g., RdRdy). The control signal is used to cause the access circuitry to latch data at the FIFO memory after a suitable period of time to receive the data at the FIFO memory has elapsed. The delays ensure that the data is latched before the FIFO memory is closed (e.g., latched). To that end, each of the number of inverters and the additional number of inverters/delays may contribute to the total area, current, and power consumed by the memory device.

Additionally or alternatively, the memory device may generate a column address signal (CA210) to indicate to the FIFO memory a location (e.g., a particular memory bank 12 and/or an address within the particular memory bank 12) of a burst of data bits and/or a suitable order of the burst of data bits. In some embodiments, the memory device may transmit the column address signal corresponding to each of a number of signal lines included in a bus. Accordingly, in some embodiments, the memory device may include combinatorial circuitry corresponding to each of the signal lines to suitably replicate and/or extend the precision of the address received in the column address signal. Thus, increasing the number of signal lines implemented in the memory device may increase the combinatorial circuitry used for the column address signal, which may increase the area, power, and/or current consumed by the memory device. Further, in some embodiments, based on the waveform of the CA210 signal, multiple inverters may be concurrently at least partially on (e.g., transitioning from on to off or transitioning from off to on), which may further contribute to the current and/or power consumed by the memory device.

Accordingly, to reduce the area, current, and/or power consumed by the memory device, the access circuitry may modify the waveform of the Qin signal. More specifically, in some embodiments, the access circuitry may hold the FIFO memory location closed until data is ready to be latched at the FIFO memory location by holding the Qin signal at a first state. The access circuitry may then pulse the Qin so that the FIFO memory location is temporarily opened, receives the data, and latches the received data during the Qin pulse. As such, in response to determining data is ready to be latched at the FIFO memory, the access circuitry may pulse the default-closed FIFO memory open instead of closing a default-open FIFO memory. Accordingly, the FIFO memory location may not receive an irrelevant burst of data bits. To that end, the memory device may be implemented without the number of inverters described above. Further, because the access circuitry may pulse the Qin signal in response to receiving the RdRdy signal, the memory device may be implemented without the additional number of inverters/ delays described above.

Moreover, in some embodiments, the access circuitry may generate the column address signal by pulsing one or more bits on a column address bus that corresponds to each of the signal lines of the bus. Accordingly, the combinatorial circuitry may be centralized at the access circuitry, which may reduce the area, current, and/or power consumed by the memory device.

Figure 1:
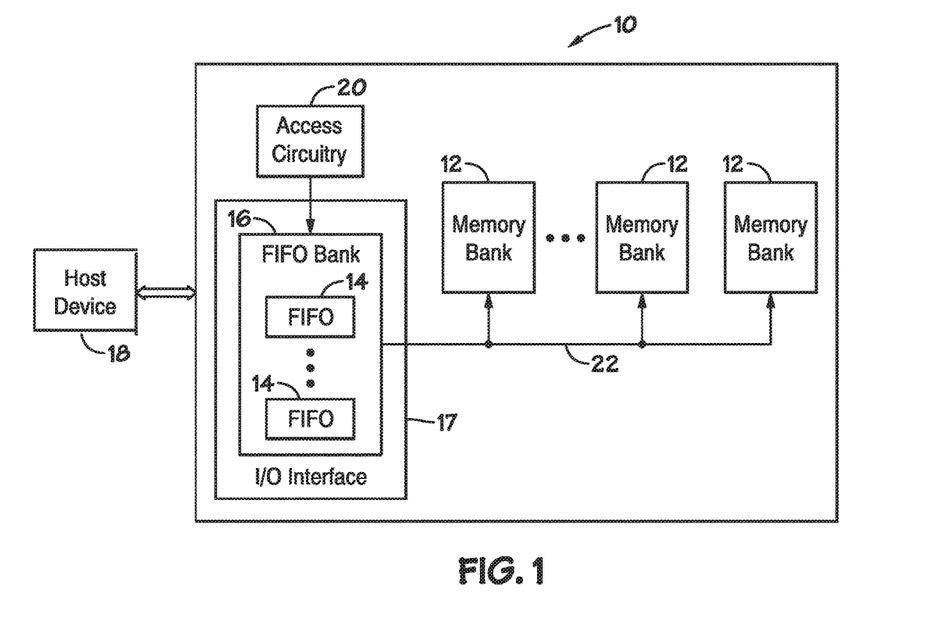
FIG. 1 is a simplified block diagram illustrating certain features of a memory device, according to an embodiment of the present disclosure.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a synchronous dynamic random access memory (SDRAM) device, such as a double data rate type four (DDR4) or type five (DDR5) SDRAM.

The memory device 10, may include a number of memory banks 12. The memory banks 12 may be DDR4 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR4, the memory banks 12 may be further arranged to form bank groups. For instance, for an 8 gigabyte (Gb) DDR4 SDRAM, the memory chip may include 16 memory banks 12, arranged into 8 bank groups, each bank group including 2 memory banks. For a 16 Gb DDR4 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a first-in, first-out (FIFO) memory 14 to transport data into and/or out of the memory device 10. The FIFO memory 14 may be implemented in hardware using a shift register and/or any suitable circuitry, such as an additional memory structure. Further, in some embodiments, the memory device 10 may include a number of FIFO memories 14 arranged in a FIFO bank 16. Additionally or alternatively, the FIFO memory 14 may be included in an input/output (I/O) interface 17 implemented to communicate information between the host device 18 and the memory device. Further, various other configurations, organization and sizes of the FIFO memories 14 on the memory device 10 may be utilized depending on the application and design of the overall system.

The memory device 10 may be communicatively coupled to a host device 18 (e.g., an external device), such as controller or a processor. Accordingly, the memory device 10 may receive various signals (e.g., commands), such as read commands, write commands, mode-register set commands, activate commands, and/or the like, from the host device 18. As such, commands received at the memory device 10 from the host device 18 may facilitate the transmission and/or receipt of data to be written to and/or read from the memory device 10. That is, for example, as described in greater detail below, in response to receiving a suitable command from the host device 18 to read data from and/or write data to the memory device 10, the memory device 10 may access the memory banks 12.

The memory device 10 may include access circuitry 20 implemented to facilitate access to the memory banks 12 based on, for example, timing control and/or data control. Accordingly, in some embodiments, after receiving a command from the host device 18, the memory device 10 may decode the command, and the access circuitry 20 may provide access to a particular memory bank 12 corresponding to the decoded command. Additionally or alternatively, each memory bank 12 may include bank control circuitry (not shown), which may provide decoding (e.g., a row decoder and a column decoder), as well as other features, such as timing control and data control, to facilitate the execution of commands to and from the memory banks 12.

To execute an operation, such as a read command, a memory bank 12 may transmit a clocking signal (RdRdy), which may indicate that data stored at the memory bank 12 is currently available for transmission (e.g., access), to the access circuitry 20. Additionally or alternatively, the memory bank 12 may transmit a clocking signal that indicates the memory bank 12 is currently available for receipt and/or storage of data. In any case, after receiving the RdRdy signal as an indication that data stored in the memory bank 12 is currently available, the access circuitry 20 may facilitate access to the memory bank 12. That is, for example, using command and/or clocking signals, the access circuitry 20 may coordinate the transmission of data signals, such as Data IO signals (e.g., DQ signals), to and/or from the memory bank 12 over a bus 22, which may include multiple of bi-directional data buses. More specifically, in some embodiments, the access circuitry 20 may facilitate the transmission of the data signals to and/or from the memory bank 12 via the FIFO bank 16 communicatively coupled to the bus 22.

Accordingly, the access circuitry 20 may control operation of the FIFO bank 16 and/or each of its FIFO memories 14. To that end, the access circuitry 20 may communicate one or more control signals and/or timing signals to and/or from the FIFO bank 16. As such, the access circuitry 20 may provide one or more signals to the FIFO bank 16 to control latching a data signal into and/or out of a particular FIFO memory 14. For example, in response to receiving the RdRdy signal that indicates that data stored in the memory bank 12 is currently available, the access circuitry 20 may facilitate transmission of a data signal via the bus 22 from the memory bank 12 to a FIFO memory 14. The access circuitry 20 may then, using a timing signal (Qin), coordinate latching of the data signal into the FIFO memory 14 for storage. Additionally or alternatively, the access circuitry 20 may, in response to determining the memory bank 12 is available to store data, coordinate transmitting data stored in a respective FIFO memory 14 and/or another suitable location (e.g., on the memory device 10 and/or the host device 18) to the memory bank 12 over the bus 22.

In some embodiments, following storage in the FIFO memory 14, data may be transmitted to the host device 18, for example. Accordingly, the host device 18 may receive, for example, data requested in a read command. In some embodiments, the data may be exchanged between the memory device 10 and the host device 18 via the I/O interface 17. Additionally or alternatively, the data signal may be routed to another location in the memory device and/or to another suitable device.

As will be appreciated, various other components, such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Moreover, while the memory device 10 is described as a DDR4 SDRAM device, the memory device 10 may additionally or alternatively be implemented in any other suitable semiconductor devices. For instance, the memory device may be implemented at least in part as a double data rate type one synchronous dynamic random access memory (DDR1 SDRAM), a double data rate type two synchronous dynamic random access memory (DDR2 SDRAM), a double data rate type three synchronous dynamic random access memory (DDR3 SDRAM), double data rate type five synchronous dynamic random access memory (DDR5 SDRAM), and/or the like. Accordingly, it should be understood that the block diagram of FIG. 1 is only provided to highlight certain functional features of the memory device 10 to aid in the subsequent detailed description.

Figure 2:
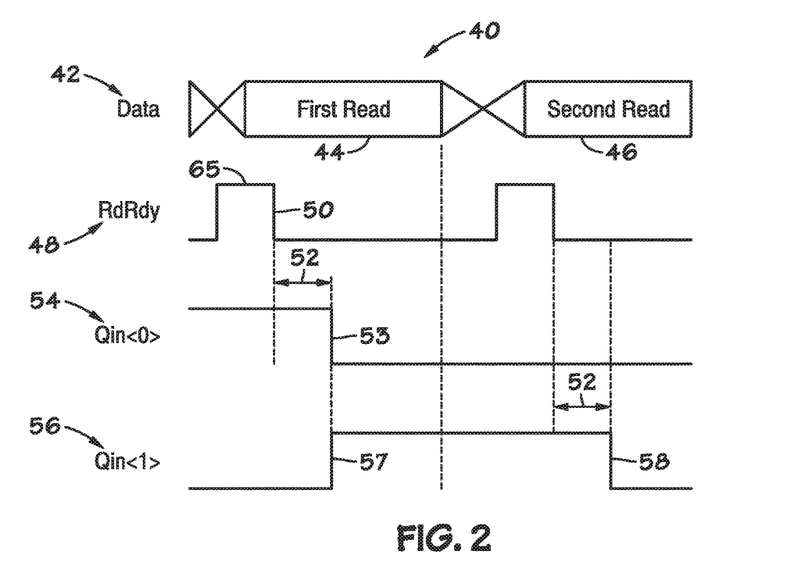
FIG. 2 illustrates a timing diagram indicating a relationship between a data signal, a clocking signal (RdRdy), and a set of control signals (Qin<0> and Qin<1>), according to an embodiment of the present disclosure.

Turning now to FIG. 2, a timing diagram 40 indicating a relationship between a data signal (Data) (e.g., DQ), the RdRdy signal, and a set of Qin signals (e.g., Qin<0> and Qin<1>) is illustrated. As illustrated, a data waveform 42 includes a first burst of data bits 44 (e.g., DQ bits) and a second burst of data bits 46. In some embodiments, as discussed above, a memory bank 12 may adjust (e.g., pulse) the RdRdy signal to indicate data is available to be accessed at the memory bank 12. Accordingly, the RdRdy waveform 48 may transition states such that the access circuitry 20 may identify a value of the RdRdy signal (e.g., high or low) and/or the change in a state of the RdRdy waveform 48 to determine that the data is available to be accessed at the memory bank 12. That is, for example, the memory bank 12 may default to holding the RdRdy signal at a first state (e.g., low) and may pulse the RdRdy signal to a second state (e.g., high) to indicate that data is available to be accessed at the memory bank 12. While the illustrated RdRdy waveform 48 is held in a low (e.g., false) state and pulsed to a high (e.g., true) state, in some embodiments, the RdRdy waveform 48 may be held in a high state and pulsed to a low state to indicate that data is available to be accessed at the memory bank 12.

As previously discussed, in response to determining the RdRdy signal indicates that the data is currently available to be accessed at the memory bank 12, the access circuitry 20 may coordinate latching the data at a respective FIFO memory 14 using a respective control signal Qin. Accordingly, the access circuitry 20 may hold a first Qin signal (Qin<0>) at a second state until the data is available to be accessed at the memory bank 12. The Qin<0> signal may be used to control data latching at a first FIFO memory location (e.g., a particular FIFO memory 14 and/or a particular address of the FIFO memory 14). Once the data is available, the access circuitry 20 may then transition the Qin<0> signal to the first state. More specifically, the access circuitry 20 may hold the Qin<0> signal at a state suitable to maintain the first FIFO memory location in an open state. After receiving the RdRdy signal as an indication that the data is currently available to be accessed at the memory bank 12, the access circuitry 20 may adjust the Qin<0> signal such that the first FIFO memory location closes, which may latch the accessed data into the FIFO memory 14. Accordingly, in some embodiments, the access circuitry 20 may detect a transition in the RdRdy signal, such as the illustrated falling edge 50 of the RdRdy waveform 48, and in response to detecting the transition, the access circuitry 20 may adjust the state of the Qin<0> signal to facilitate latching the data into the first FIFO memory location.

Further, in some embodiments, the memory device 10 may include a number of delay elements, such as inverters, to delay the arrival of the RdRdy signal at the access circuitry 20 by a delay duration 52. The memory device 10 may delay the RdRdy signal such that the data accessed from the memory bank 12 is available to latch at the FIFO memory 14 (e.g., received at the FIFO memory 14 from the bus 22) when the Qin signal transitions. To that end, because the transition 53 of the Qin<0> signal may cause the FIFO memory 14 to close (e.g., latch), data received after the transition 53 may not be stored in FIFO memory 14, while data received prior to the transition 53 may be latched into the FIFO memory 14 at the transition 53. Accordingly and as illustrated, a Qin<0> waveform 54 may include the delay duration 52 between the falling edge 50 (e.g., a transition) of the RdRdy waveform 48 and a transition 53 of the Qin<0> signal from a first state to a second state.

A second control signal (e.g., Qin<1>) 56, which may represent a second signal of a control signal (Qin) bus, may control data latching at a second FIFO memory location. In some embodiments, the Qin<0> signal and the Qin<1> signal may each act as pointers received from the Qin bus to latch data at a respective address (e.g., queue position) of the FIFO memory 14. Additionally or alternatively, the Qin<0> signal and the Qin<1> signal may each enable/disable data latching at a respective FIFO memory 14 of the FIFO bank 16. Further, in some embodiments, the memory device 10 may not latch data at the second FIFO memory location until data is latched at the first FIFO memory location. Accordingly, as illustrated in the waveform of Qin<1> 56, the state of the Qin<1> signal may be held at a state until the first burst of data bits 44 is latched at the first FIFO memory 14 location. As such, the FIFO memory 14 may latch the first burst of data bits 44 at the correct FIFO memory 14 location. The state of the Qin<1> signal may then transition to open and receive data, such as the second burst of data bits 46, at the second FIFO memory location. That is, for example, the Qin<1> signal may include a transition 57 between states in response to the latching of the first FIFO memory location (e.g., in response to the transition 53 of the state of the Qin<0> signal).

After determining that additional data is available to be accessed at the memory bank 12, the access circuitry 20 may transition a second Qin signal (the Qin<1> signal) from a first state to a second state. Before transitioning the Qin<1> signal, the access circuitry may wait the delay duration 52. Further, in some embodiments, transitioning the Qin<1> signal to the second state may latch the second burst of data bits 46 at the FIFO memory 14. Thus, as illustrated in the waveform of Qin<1> 56, the Qin<1> signal may include a transition 58 from a high state to a low state. Alternatively, the access circuitry 20 may hold the Qin<1> signal at a low state and transition the Qin<1> signal to a high state in response to determining that the data is available to be accessed at the memory bank 12.

In some embodiments, because the Qin<1> signal may transition states to open the second FIFO memory location while the first burst of data bits 44 is still available (e.g., on the bus 22), the second FIFO memory location may include the first burst of data bits 44. Accordingly, to suitably latch the second burst of data bits 46 at the second FIFO memory location, the memory device 10 may overwrite the first burst of data bits 44 previously stored in the second FIFO memory location. That is, for example, because the first burst of data bits 44 may contain one or more bits that are the inverse of one or more bits in corresponding bit positions of the second burst of data bits 46, the memory device 10 may invert bits in the FIFO memory 14. To perform such inversions, in some embodiments, the memory device 10 may include a number of inverters (not shown) implemented to clear data in the FIFO memory 14 prior to reading (e.g., storing) additional data in the FIFO memory 14. For example, in some embodiments, the second FIFO memory location may store the first burst of data bits 44. In such embodiments, prior to storing the second burst of data bits 46, the memory device 10 and/or the access circuitry 20 may invert one or more of the first burst of data bits 44 stored at the second FIFO memory location to clear the contents of the second FIFO memory location. The second burst of data bits 44 may then be stored at the second FIFO memory location. Accordingly, in some embodiments, if a bit of the first burst of data bits 44 stored in the second FIFO memory location is high (e.g., binary one), the memory device 10 may use an inverter to set the bit to low (e.g., binary zero). If a bit in a corresponding bit position of the second burst of data bits 46 to be stored in the second FIFO memory location is high (e.g., binary one), the memory device 10 may use the inverter to set the same bit position of the second FIFO memory location from low back to high.

While the above-described inversion includes clearing the first burst of data bits, the access circuitry 20, inverters, and/or the FIFO memory 14 may be implemented to clear any suitable data. Accordingly, in some embodiments, noise and/or unwanted signals present in the FIFO memory 14 may be cleared from the FIFO memory 14. Thus, it should be appreciated embodiments described herein are intended to be illustrative and not limiting.

In some embodiments, holding a FIFO memory 14 in an open state by, for example, maintaining a Qin signal (e.g., Qin<0> and/or Qin<1>) state, may use current, which may be an inefficient use of power resources by the memory device 10. Further, each of the inverters and/or delay elements used to delay the RdRdy signal may further increase the current and/or power draw of the memory device 10. In other words, increasing the delay duration 52 may increase the current consumed by the memory device 10. Further, in some embodiments, clearing data stored in a FIFO memory location before reading additional data into the FIFO memory 14, as described above, may further increase power of the memory device 10.

Figure 3:
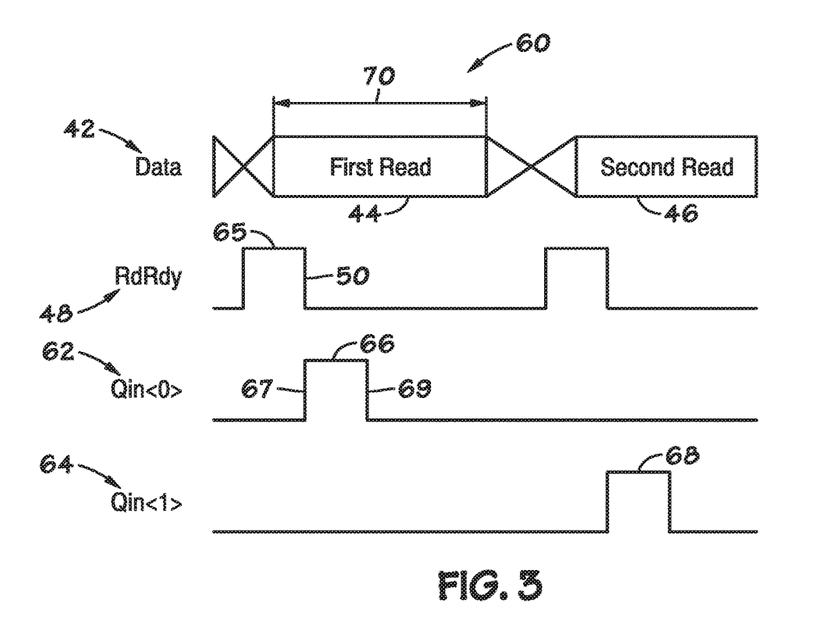
FIG. 3 illustrates a timing diagram that includes an relationship between the data signal and the RdRdy signal of FIG. 2, and an updated Qin<0> signal and the updated Qin<1> signal, according to an embodiment of the present disclosure.

Accordingly, in some embodiments, as illustrated in the timing diagram 60 of FIG. 3, the access circuitry 20 and/or the memory device 10 may adjust the timing and/or control signals to reduce the current and/or power consumed by the memory device 10 in the timing diagram 40 of FIG. 2. More specifically, in some embodiments, the access circuitry 20 may adjust the Qin control signals (e.g., Qin<0>, Qin<1>, and/or the like), as illustrated by the updated Qin<0> waveform 62 and the updated Qin<1> waveform 64, to act as hold-close signals rather than hold-open signals for the FIFO memory 14. As such, adjusting (e.g., pulsing) the state of the Qin control signals may pulse the closed FIFO memory 14 open. Further, since the Qin control signals hold the FIFO memory closed until data is ready to be latched at the FIFO memory 14, the memory device 10 may omit delay of the RdRdy signal using delay circuitry, as described in further detail below.

In some embodiments, instead of holding the FIFO memory 14 open until suitable data is ready to be latched, as described above with reference to FIG. 2, the access circuitry 20 may provide Qin control signals suitable to maintain the FIFO memory 14 closed until suitable data is ready to be latched. In such embodiments, in response to determining data is ready to be latched at the FIFO memory 14 (e.g., in response to determining the RdRdy signal indicates data is ready to be accessed at the memory bank 12), the access circuitry 20 may pulse a suitable Qin signal. That is, as illustrated by the updated Qin<0> waveform, to read the first burst of data bits 44 into the first FIFO memory location, the access circuitry 20 may hold Qin<0> at a first state to keep the FIFO memory 14 closed. Then, in response to a pulse 65 of the RdRdy signal indicates the first burst of data bits 44 is ready to be accessed at the memory bank 12, the access circuitry 20 may pulse Qin<0> from the first state to the second state and back to the first state. During the rising edge 67 of a pulse 66, the FIFO memory 14 may open to enable the FIFO memory 14 to receive the first burst of data bits 44 from the bus 22. The falling edge 69 of the pulse 66, then latches the first burst of data bits 44 in the FIFO memory 14.

In some embodiments, because the first burst of data bits 44 is read and/or received at the FIFO memory 14 during the pulse 66, which is generated after the access circuitry 20 determines the first burst of data bits 44 is available, the timing of the pulse 66 may be more relaxed than the timing of the transition of the Qin<0> waveform 54 of FIG. 2. That is, for example, while the waveform of the Qin<0> signal includes the delay duration 52 to ensure each of the first burst of data bits 44 is latched into the first FIFO memory location, the updated Qin<0> waveform 62 may not include the delay duration 52. Instead, the Qin<0> signal may include a pulse 66 with a fixed width (e.g., pulse width), which may be generated by a pulse generator and/or any other suitable circuitry, which may be included in the access circuitry 20.

Further, as illustrated by the updated Qin<1> waveform 64, the access circuitry 20 may pulse the Qin<1> signal from a first state to a second state and back to the first state in response to determining that the second burst of data bits 46 is ready to be accessed at the memory bank 12 based on the RdRdy signal. Because the pulse 68 of the Qin<1> signal may not overlap with the period 70 that the first burst of data bits 44 is available, the memory device 10 may forgo clearing and/or inverting data in the FIFO memory 14 prior to reading and/or receiving the second burst of data bits 46. That is, as illustrated, since the second FIFO memory location may not receive and/or read the first burst of data bits 44 nor another data signal prior to receiving the second burst of data bits 46, the memory device 10 may forgo clearing any data (e.g., invert bits) in the second FIFO memory location. Accordingly, in some embodiments, the memory device 10 may include fewer inverters implemented to clear the second FIFO memory location, as described above in relation to FIG. 2.

Further, in some embodiments, the memory device 10 may generate a column address signal (e.g., CA210) in response to a command, such as a read and/or write command, received from the host device 18. The CA210 signal may represent the starting of address of a particular set and/or burst of data. For example, the CA210 may correspond to an address of the first burst of data bits 44 in the memory bank 12. Additionally or alternatively, in some embodiments, the memory device 10 may use the CA210 signal to determine an order of a burst of data bits on, for example, the bus 22. Accordingly, in some embodiments, the access circuitry 20, the FIFO memory 14, the memory bank 12, or a combination thereof may use the CA210 signal to store to and/or retrieve data from a suitable address and/or to arrange and/or receive a burst of data in a suitable order. More specifically, in some embodiments, the memory device 10 may include one or more inverters that may enable the access circuitry 20, the FIFO memory 14, the memory bank 12, or a combination thereof to perform an action based on the CA210 signal, such as receiving data at the FIFO memory 14 from the address specified by the CA210 signal.

Further, in some embodiments, the memory device 10 may extend the CA210 signal from an address with a first number of bits to an address with a second number of bits that is greater than the first number. For example, in the case of a bus 22 having 8 data signal lines, which may concurrently transmit 8 data bits in parallel, the memory device 10 may extend a 4-bit address to an 8-bit address. In any case, to extend the address, the memory device 10 may include combination logic (e.g., combinatorial circuitry) at each of the signal lines (e.g., data pins and/or channels) included in the bus 22. Accordingly, in the case of a bus 22 that includes 8 signal lines, the memory device 10 may include a duplicate of the combination logic at each of the 8 signal lines. As such, increasing the number of signal lines in the bus 22 may increase the area used on the memory device 10 to accommodate the combination logic corresponding to each of the signal lines. Further, increasing the number of implementations of the combination logic may increase the current consumed by the memory device 10, as each of the implementations of the combination logic may contribute to the total current consumed by the memory device 10.

Further, the data signals transmitted over the bus 22 whose addresses may be identified by the CA210 may toggle and/or change (e.g., from the first burst of data bits 44 to the second burst of data bits 46). As the data signals on the bus 22 transition, the CA210 signal corresponding to the data signals may change (e.g., from an address associated with the first burst of data bits 44 to an address associated with the second burst of data bits 46). Further, in some embodiments, during the transition of the data signals and/or the CA210 signal, the CA210 signal may become misaligned with the current data signal on the bus 22. For example, in some embodiments, when the data signal transitions from the first burst of data bits 44 to the second burst of data bits 46, the CA210 address may not transition concurrently, which may result in the CA210 signal indicating the address associated with the first burst of data bits 46 while the second burst of data bits 46 is currently on the bus 22. More specifically, in some embodiments, when the CA210 and the data signal become misaligned, two or more of the inverters in the memory device 10 may concurrently be at least partially on. That is, for example, a first inverter responsive to the CA210 signal corresponding to the address of the first burst of data bits 44 may begin turning off during the transition, while a second inverter responsive to the CA210 signal corresponding to the second burst of data bits 46 may begin turning on during the transition. Accordingly, both the first inverter and the second inverter may draw current during the transition, which may contribute to the current and/or power consumed by the memory device 10.

Figure 4:
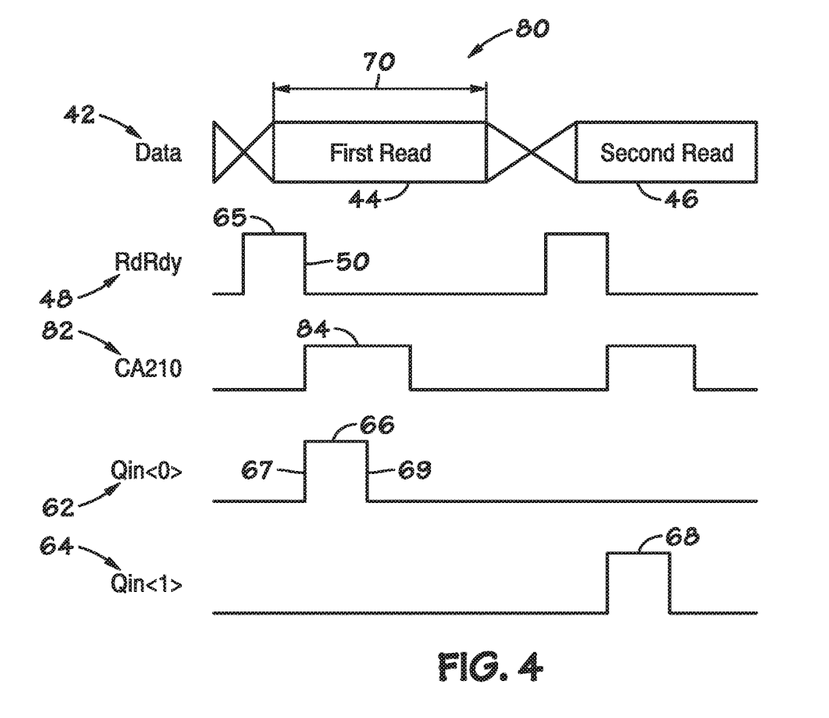
FIG. 4 is a timing diagram indicating a relationship between the data signal, the RdRdy signal, and the updated Qin<0> signal and the updated Qin<1> signal of FIG. 3 and a column address signal (CA210), according to an embodiment of the present disclosure.

Turning now to FIG. 4, a timing diagram 80 illustrates the same waveforms of FIG. 3 (e.g., the data waveform 42, the RdRdy waveform 48, and the updated waveform of the Qin<0> signal, the updated waveform of the Qin<1> signal). Additionally, the timing diagram 80 includes a waveform of a portion of the CA210 signal 82. While embodiments described above may include a CA210 signal replicated and/or extended by combinatorial logic on each of the signal lines of the bus 22, some embodiments may include a CA210 signal bus routed to each DQ rather than generating individual CA210 signals locally at each DQ. Accordingly, the CA210 signal bus may be routed to each of the signal lines of the bus 22 and/or included in the bus 22. Further, a single implementation of the combination logic may be centralized at, for example, the access circuitry 20. Accordingly, the combination logic and/or the access circuitry 20 may pulse one or more bits of the CA210 signal bus to communicate the burst address, as illustrated by the CA210 signal 82. More specifically, in some embodiments, the access circuitry 20 may route a CA210 signal pulse at one or more bits of the CA210 signal bus along with the Qin signal to each of the data pins associated with the bus 22.

In some embodiments, the memory device 10 may pulse a one or more bits of the CA210 signal bus in response to determining data is ready to be accessed at the memory bank 12. More specifically, in some embodiments, the access circuitry 20 may pulse the one or more bits of the CA210 signal bus in response to determining the RdRdy signal is at a particular state, such as transitioning from a second state back to a first state (e.g., falling edge 50). That is, for example, the access circuitry 20 may pulse the one or more bits of the CA210 signal bus in response to the same event used to pulse the corresponding Qin signal(s), as discussed above. Additionally or alternatively, the access circuitry 20 may pulse the one or more bits of the CA210 signal bus in response to a different event, such as in response to identifying a particular portion of a pulse in the RdRdy signal, a rising edge of the RdRdy signal, and/or the like.

In any case, the access circuitry 20 may pulse the CA210 before a Qin signal such that at least one of the one or more bits of the CA210 signal bus transitions between states before a corresponding Qin signal of the Qin bus transitions between states. Accordingly, the address of the burst of data bits may be available at the FIFO memory 14 before the FIFO memory 14 is opened to receive a burst of data bits (e.g., the first burst of data bits 44 and/or the second burst of data bits 46). As such the FIFO memory 14 may retrieve a suitable burst of bits from the address indicated by the CA210 signal bus and/or may arrange a received burst of bits based on an order specified by the CA210 signal bus.

Further, in some embodiments, as illustrated by the waveform of the portion of the CA210 signal 82, the pulse 84 of at least one of the one or more bits of the CA210 signal bus may last a longer duration than a pulse in a Qin signal. Accordingly, the pulse 84 of the at least one bit of the CA210 signal bus may transition after a FIFO memory location corresponding to the pulsed Qin signal is closed (e.g., latched). As such, the memory device 10 and/or the FIFO memory 14 may arrange a received burst of bits based on an order specified by the CA210 signal bus. Additionally or alternatively, by transitioning the CA210 signal after the respective Qin signal, an alignment between the CA210 signal and the data signals received over the bus 22 may be maintained.

While the timing diagrams (e.g., 40, 60, and 80) described herein include signals having a first state and a second state, which may be illustrated by a logically low and a logically high state, respectively, it should be appreciated that the memory device 10 may be implemented to operate using signals with any suitable state. That is, for example, inverse logic (e.g., logically high in place of logically low signals) may be implemented with any suitable combination of the data waveform 42, the RdRdy waveform 48, the Qin signals, the waveform of the portion of the CA210 signal 82, and/or the like. Moreover, while the access circuitry 20 is described as detecting a transition at the falling edge 50 of the RdRdy signal, in some embodiments, the access circuitry 20 may detect any suitable portion of the RdRdy signal, such as a rising edge, some duration after the rising edge, or a combination thereof. Further, while the timing diagrams (e.g., 40, 60, and 80) are described as having the Qin<0> signal and the Qin<1> signal, in some embodiments, the Qin bus and/or the memory device 10 may include any suitable number of Qin control signals. Thus, embodiments described herein are intended to be illustrative and not limiting.

Figure 5:
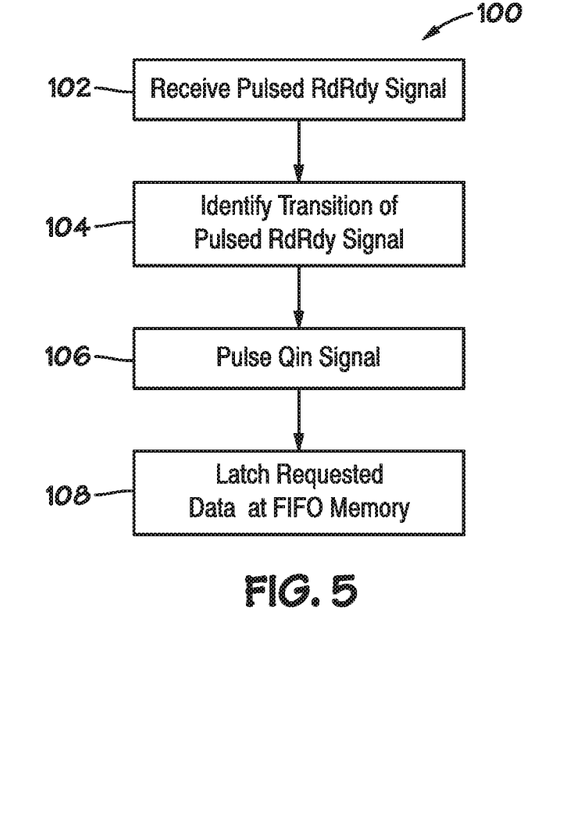
FIG. 5 is a flow chart of a method for controlling operation of a first-in, first-out (FIFO) memory, according to an embodiment of the present disclosure.

With the foregoing in mind, FIG. 5 illustrates a flow chart of a method 100 for latching data at the FIFO memory 14 based on one or more timing and/or control signals, in accordance with embodiments described herein. Although the following description of the method 100 is described in a particular order, which represents a particular embodiment, it should be noted that the method 100 may be performed in any suitable order, and steps may be added or omitted. Moreover, although the following description of the method 100 is described as being performed by the memory device 10, it should be noted that the method 100 may be performed at least in part by the access circuitry 20, a memory bank 12, a FIFO memory 14, and/or any suitable circuitry and/or computing device, which may include one or more processors. Furthermore the method 100 may be implemented using dedicated hardware, software, or a combination thereof.

In some embodiments, the memory device 10 may initiate the method 100 in response to receiving a read command requesting particular data from, for example, the host device 18. In response to the read command, the memory device 10 may determine a memory bank 12 to read requested data from and may instruct the memory bank 12 to fetch (e.g., retrieve) the requested data. In some embodiments, when the memory bank 12 has fetched the requested data and/or is available to fetch the requested data, the memory bank 12 may pulse the RdRdy signal from a first state to a second state and back, as illustrated by the RdRdy waveform 48. Accordingly, the memory device 10 may receive a pulsed RdRdy signal (process block 102). In some embodiments, for example, the memory device 10 may receive the pulsed RdRdy signal at the access circuitry 20.

After receiving the pulsed RdRdy signal, the memory device 10 may identify a transition of the pulse of the pulsed RdRdy signal (process block 104). That is, for example, when the received pulsed RdRdy signal includes a pulse that transitions the RdRdy signal from a low state to a high state and back, the memory device 10 may identify the falling edge 50 (e.g., the second transition) of the pulse of the RdRdy signal. Additionally or alternatively, in some embodiments, the memory device 10 may identify a rising edge of the pulse of the RdRdy signal, and/or the memory device 10 may identify another suitable portion of the pulse, such as a portion of the pulse having a particular state and/or a first transition of the pulse.

In any case, after identifying the transition of the pulse of the pulsed RdRdy signal, the memory device 10 may pulse a suitable Qin signal (process block 106). The suitable Qin signal may correspond to (e.g., point to) a respective FIFO memory location. Further, to pulse the Qin signal, the memory device 10 may use a pulse generator and/or other suitable circuitry, which may be included in the access circuitry 20 and/or in another suitable portion of the memory device 10.

In response to pulsing the Qin signal, the memory device 10 may latch the requested data corresponding to the pulsed Qin signal in the FIFO memory 14 (process block 108). More specifically, in some embodiments, the memory device 10 may maintain the FIFO memory 14 as closed until the requested data is available. In such embodiments, the Qin signal may control the state (e.g., open and/or closed) of the FIFO memory 14 address. Accordingly, the memory device 10 may maintain the Qin signal in a state suitable to keep the FIFO memory 14 closed until the requested data is available, as indicated by the identified transition of the pulsed RdRdy signal. Accordingly, by pulsing the Qin signal in response to identifying the transition of the pulsed RdRdy signal, the memory device 10 may temporarily open the FIFO memory 14 at the address corresponding to the Qin signal. For example, a pulse width of the Qin signal may determine how temporarily the FIFO memory 14 is open. While the FIFO memory 14 is open, the FIFO memory 14 may receive and store the requested data from the bus 22. Further, at the end of the pulse 66 of the Qin signal (e.g., the transition 69), the FIFO memory 14 returns to a closed state, which may latch in the requested data at the address corresponding to the Qin signal.

Figure 6:
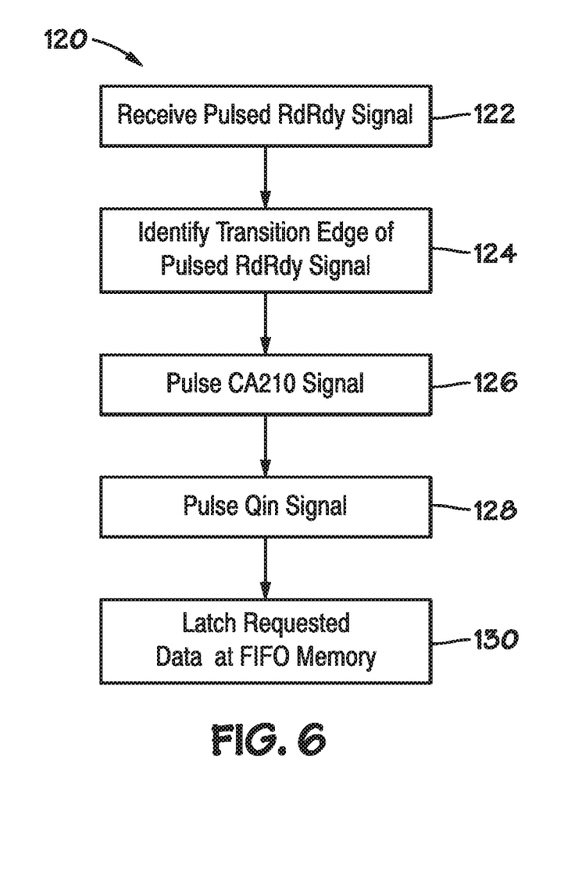
FIG. 6 is a flow chart of an additional method for controlling operation of a FIFO memory, according to an embodiment of the present disclosure.

With the foregoing in mind, FIG. 6 illustrates a flow chart of an additional method 120 for latching data at the FIFO memory 14 based on one or more timing and/or control signals, in accordance with embodiments described herein. Although the following description of the method 120 is described in a particular order, which represents a particular embodiment, it should be noted that the method 120 may be performed in any suitable order, and steps may be added or omitted. Moreover, although the following description of the method 120 is described as being performed by the memory device 10, it should be noted that the method 120 may be performed at least in part by the access circuitry 20, a memory bank 12, a FIFO memory 14, and/or any suitable circuitry and/or computing device, which may include one or more processors. Furthermore the method 100 may be implemented using dedicated hardware, software, or a combination thereof.

In some embodiments, the method 120 may be identical to the method 100 with the exception that the method 120 may include pulsing a one or more bits of the CA210 signal bus (process block 126). Accordingly, as described above with reference to FIG. 5, the method 120 may also involve receiving a pulsed RdRdy signal (process block 122), identifying a transition of the pulse of the pulsed RdRdy signal (process block 124), pulsing a suitable Qin signal (process block 128), and latching data at a FIFO memory 14 location (process block 130).

In some embodiments, after identifying a transition of the pulse of the pulsed RdRdy signal, the memory device 10 may pulse one or more bits of the CA210 signal bus (process block 126). More specifically, in some embodiments, the access circuitry 20 may, using combinatorial logic, identify one or more bits of the CA210 signal bus to pulse. The access circuitry 20 may then pulse the identified one or more bits of the CA210 signal bus using a pulse generator and/or additional suitable circuitry. Further, as illustrated in FIG. 6 and discussed above, in some embodiments, the memory device 10 may pulse the identified one or more bits of the CA210 signal bus prior to pulsing the suitable Qin signal.

Accordingly, latching data at a FIFO memory location (process block 130) may involve determining, based on the pulsed one or more bits of the CA210 signal bus, the address to retrieve the data from at the memory bank 12 and/or an order to arrange a burst of bits received from the bus 22.

Further, in some embodiments, the method 120 may omit pulsing the Qin signal (process block 128). Alternatively, the method 120 may involve transitioning the Qin signal from a first state to a second state such that an address in memory held in an open state transitions to a closed (e.g., latched) state, as described with reference to FIG. 2. Accordingly, the method 120 may involve latching the data at a FIFO memory location (process block 130) after pulsing the one or more bits of the CA210 signal bus (process block 126) and/or in response to the transition of the suitable Qin signal from the first state to the second state. That is, for example, the method 120 may include any suitable combination of the techniques described above.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
maintaining, using access circuitry of a memory device, a first control signal at a first state, wherein the first control signal is configured to control whether data is permitted to be stored in a first-in, first-out (FIFO) memory of the memory device communicatively coupled to the access circuitry, wherein, in the first state, the first control signal is configured to maintain the FIFO memory in a closed state, wherein the closed state is a default state;
receiving, at the access circuitry, a pulsed second control signal from a memory bank of the memory device communicatively coupled to the access circuitry;
identifying, using the access circuitry, a transition of the pulsed second control signal from a second state to a third state, wherein the transition is indicative of first data stored in the memory bank is available to be retrieved;
in response to identifying the transition, pulsing, using the access circuitry, a column address signal, wherein the FIFO memory is configured to identify a location of the first data at the memory bank based at least in part on the pulsed column address signal;
in response to identifying the transition, pulsing, using the access circuitry, the first control signal from the first state to a fourth state and back to the first state, wherein, in the fourth state, the first control signal is configured to permit the first data to be stored in the FIFO memory; and
in response to pulsing the first control signal, latching the first data at the FIFO memory.

2. The method of claim 1, wherein identifying the transition comprises identifying, in a pulse of the pulsed second control signal, a rising edge from the second state to the third state, a portion of the pulse having the second state, a falling edge from the second state to the third state, or combination thereof.

3. The method of claim 1, wherein the FIFO memory is configured to arrange the first data latched at the FIFO memory based in part on the pulsed column address signal.

4. The method of claim 1, comprising pulsing the column address signal prior to pulsing the first control signal.

5. The method of claim 1, comprising:
maintaining, using the access circuitry, a third control signal at the first state;
receiving, at the access circuitry, a pulsed fourth control signal from the memory bank;
identifying, using the access circuitry, an additional transition of the pulsed fourth control signal from the second state to the third state, wherein the additional transition is configured to indicate second data stored in the memory bank is available to be retrieved;
in response to identifying the additional transition, pulsing, using the access circuitry, the third control signal from the first state to the fourth state and back to the first state; and
in response to pulsing the third control signal, latching the second data at one or both of the FIFO memory or an additional FIFO memory of the memory device.

6. The method of claim 5, wherein latching the first data at the FIFO memory comprises latching the first data at a first address of the FIFO memory associated with the first control signal, wherein latching the second data at the FIFO memory comprises latching the second data at a second address of the FIFO memory associated with the third control signal.

7. The method of claim 1, comprising:
receiving, at the access circuitry, the pulsed second control signal from the memory bank in response to receiving, at the memory device, a read command from a host device communicatively coupled to the memory device.

8. A memory device, comprising:
a memory bank;
a first-in, first-out (FIFO) memory communicatively coupled to the memory bank via a data bus; and
access circuitry communicatively coupled to the memory bank and the FIFO memory, wherein the access circuitry is configured to:
maintain a first control signal at a first state, wherein the first control signal is configured to control whether data is permitted to be stored in the FIFO memory, wherein, in the first state, the first control signal is configured to maintain the FIFO memory in a closed state, wherein the closed state is a default state;
receive, at an input of the access circuitry, a second control signal from the memory bank, wherein the second control signal transitions from a second state to a third state and back to the second state;

identify a transition of the first control signal from the third state to the second state, wherein the transition is indicative of additional data stored in the memory bank is available to be retrieved; and in response to identifying the transition, pulse, at an output of the access circuitry, the first control signal from the first state to a fourth state and back to the first state, wherein in the fourth state, the first control signal is configured to permit the additional data to be stored in the FIFO memory, wherein the FIFO memory is configured to, in response to receiving the pulsed second control signal, latch the additional data at the FIFO memory, wherein the access circuitry comprises combinatorial logic circuitry configured to identify a column address signal, wherein the access circuitry is configured to, in response to identifying the transition, pulse the identified column address signal, wherein the FIFO memory is configured to identify a location of the additional data at the memory bank based at least in part on the pulsed column address signal.

9. The memory device of claim 8, wherein the access circuitry comprises a pulse generator configured to pulse the second control signal.

10. The memory device of claim 8, comprising input/output (I/O) interface circuitry configured to communicatively couple the memory device to a host device.

11. The memory device of claim 10, wherein the I/O interface circuitry comprises the FIFO memory.

12. The memory device of claim 8, wherein the first state comprises a logical high state, and the fourth state comprises a logical low state.

13. The memory device of claim 8, wherein the first state comprises a logical low state, and the fourth state comprises a logical high state.

14. The memory device of claim 8, wherein the access circuitry is configured to transmit the pulsed column address signal to the FIFO memory over one or more bits of a column signal address bus.

15. The memory device of claim 8, wherein the memory device comprises a double data rate type four synchronous dynamic random access memory (DDR4 SDRAM) device.

16. A method, comprising:
maintaining, using access circuitry of a memory device, a control signal at a first state, wherein the control signal is configured to control whether data is permitted to be stored in a first-in, first-out (FIFO) memory of the memory device communicatively coupled to the access circuitry, wherein, in the first state, the control signal is configured to maintain the FIFO memory in a closed state, wherein the closed state is a default state;

receiving, the access circuitry, a pulsed additional control signal from a memory bank of the memory device communicatively coupled to the access circuitry;

identifying, using the access circuitry, a transition of the pulsed additional control signal from a second state to a third state, wherein the transition is indicative of additional data stored in the memory bank is available to be retrieved;

in response to identifying the transition:
pulsing, using the access circuitry, a column address signal, wherein the column address signal is configured to identify location of the additional data in the memory bank; and pulsing, using the access circuitry, the control signal from the first state to a fourth state and back to the first state, wherein in the fourth state, the control signal is configured to permit the additional data to be stored in the FIFO memory; and in response to pulsing the control signal, latching the additional data at the FIFO memory.

17. The method of claim 16, wherein pulsing the column address signal comprises pulsing one or more bits of a column address bus communicatively coupled to the access circuitry.

18. The method of claim 16, comprising ordering the data latched at the FIFO memory based in part on the column address signal.

* * * * *